US008822095B2

(12) United States Patent  
Hannesen et al.

(10) Patent No.: US 8,822,095 B2
(45) Date of Patent: Sep. 2, 2014

(54) FUEL CELL SYSTEM COMPRISING A HEAT EXCHANGER

(75) Inventors: Uwe Hannesen, Schuepfen (CH); Akinori Tsukada, Kirchdorf (CH)

(73) Assignee: Belenos Clean Power Holding AG, Bienne (CH)

( * ) Notice: Subject to any disclaimer, the term of this patent is extended or adjusted under 35 U.S.C. 154(b) by 772 days.

(21) Appl. No.: 13/127,822

(22) PCT Filed: Apr. 15, 2009

(86) PCT No.: PCT/EP2009/054475
§ 371 (c)(1),
(2), (4) Date: Aug. 23, 2011

(87) PCT Pub. No.: WO2010/052033
PCT Pub. Date: May 14, 2010

(65) Prior Publication Data
US 2011/0294028 A1    Dec. 1, 2011

(30) Foreign Application Priority Data
Nov. 5, 2008 (EP) ..................................... 08168369

(51) Int. Cl.
*H01M 8/04* (2006.01)
*H01M 8/24* (2006.01)
(52) U.S. Cl.
USPC ........... 429/440; 429/437; 429/434; 429/433; 429/455; 429/513
(58) Field of Classification Search
CPC .......... H01M 8/04029; H01M 8/0267; H01M 8/04067
USPC ........... 429/437, 517, 513, 502, 43, 512, 440, 429/457, 456, 455
See application file for complete search history.

(56) References Cited

U.S. PATENT DOCUMENTS

| 5,202,194 A | 4/1993 | VanBerg, Jr. |
| 2005/0211436 A1 | 9/2005 | Fripp et al. |

FOREIGN PATENT DOCUMENTS

| GB | 2 158 287 A | 11/1985 |
| JP | 63-128562 | 6/1988 |
| JP | 2005-44599 | 2/2005 |

OTHER PUBLICATIONS

International Search Report issued Jul. 15, 2009 in PCT/EP2009/054475.

*Primary Examiner* — Helen O Conley
(74) *Attorney, Agent, or Firm* — Oblon, Spivak, McClelland, Maier & Neustadt, L.L.P.

(57) ABSTRACT

A fuel cell system including: a fuel cell stack including plural fuel cells sandwiched between two end plates; a fuel supply system supplying a stream of fuel gas to the fuel cell stack; an oxidizer supply system supplying a stream of oxidizer gas to the fuel cell stack; a closed loop coolant circulation system driving a cooling liquid through the fuel cell stack so that the cooling liquid enters the fuel cell stack, absorbs heat from the fuel cells, and exits the fuel cell stack. The coolant circulation system includes a circulation pump driving the cooling liquid, a heat exchanger removing heat from the cooling liquid and for at least partially transferring the heat to the stream of fuel gas and/or the stream of oxidizer gas. The heat exchanger includes a tube made from a heat-conducting material and inserted into a bore in one of the end plates, the tube and the bore defining at least a first fluid channel inside the tube and a second fluid channel in a space existing between the tube and the sides of the bore in the end plate, one of the first and second fluid channels being for the cooling liquid, and the other fluid channel being for the fuel or the oxidizer gas.

15 Claims, 3 Drawing Sheets

FUEL CELL SYSTEM COMPRISING A HEAT EXCHANGER

This is a National Phase Application in the United States of International Patent Application PCT/EP2009/054475 filed Apr. 15, 2009, which claims priority on European Patent Application No. 08168369.0 of Nov. 5, 2008. The entire disclosures of the above patent applications are hereby incorporated by reference.

FIELD OF THE INVENTION

The present invention relates generally to a fuel cell system in which heat from a cooling liquid is used to preheat a reactant gas before supplying it to the fuel cells.

BACKGROUND OF THE INVENTION

Electrochemical fuel cells convert fluid reactants, namely a stream of fuel and a stream of oxidizer, into electric power, heat and reaction products. Fuel cells generally comprise an electrolyte arranged between two porous electrically conductive electrode layers. In order to induce the desired electrochemical reaction, the anode electrode and the cathode electrode can each comprise one or more catalyst.

At the anode, the fuel moves through the porous electrode layer and is oxidized by the catalyst to produce both cations (generally protons) and electrons. The cations migrate through the electrolyte towards the cathode. The oxidizer (generally pure oxygen or a mixture containing oxygen) moves through the porous cathode and reacts with the cations coming through the membrane from the anode. The electrons, for their part, travel from the anode to the cathode through an external circuit, producing an electrical current. The electrochemical reaction between the oxidizer and the cations also produces heat. The heat causes the temperature of the fuel cell to increase during operation.

In order to produce a substantial amount of electrical power, a number of individual fuel cells must be stacked together in series with an electrically conducting separator between each fuel cell. Such an assembly of fuel cells stacked together is known as a fuel cell stack. For applications requiring a lot of energy, such as powering a vehicle for instance, very large fuel cell stacks are often used. These large stacks can sometimes comprise a hundred fuel cells or more. As would be expected, the fuel cell stacks produce quite a large amount of heat and need to be cooled in order to maintain an optimal operating temperature.

One common way of cooling a fuel cell stack is to circulate a cooling fluid through channels defining cooling circuits inside the stack. In most cases, the cooling fluid is liquid, preferably a mixture of water and anti-freeze like ethylene glycol with the possible addition of corrosion inhibitors or other agents. Patent document US 2003/0203258 discloses a prior art coolant circulation arrangement for a fuel cell stack. In a known manner, the circulation arrangement comprises a reservoir for supplying cooling liquid, a pump for driving the cooling liquid from the reservoir through channels inside the fuel cell stack, and a radiator for removing heat from the cooling liquid returning to the reservoir.

The use of a coolant circulation arrangement like the one just described allows maintaining the temperature of the fuel cells in a stack at, or near, their optimal operating temperature. Although different types of fuel cells have different optimal operating temperatures, this temperature is practically always substantially above the surrounding ambient temperature. One consequence of the temperature difference existing between the inside of the stack and the surroundings is that the reactant gases supplied to the fuel cells can be substantially colder than the fuel cells. Such a temperature difference between the reactant gases and the fuel cells can cause a number of problems. In particular, the input of colder gas into the fuel cells creates detrimental temperature differences inside the fuel cells. Furthermore, a temperature difference between stack and reactant can also lead to unwanted condensation of water vapour, in particular when recycled off gas is mixed with the reactant gas. It follows from the above that the temperature of the reactant gases supplied to the fuel cells should preferably be preheated to approximately the same temperature as the inside of fuel cell stack.

In order to preheat the reactant gases, it is known to bring them into thermal contact with the cooling fluid exiting form the fuel cell stack. For this purpose, the previously mentioned prior art coolant circulation arrangement disclosed in patent document US 2003/0203258 comprises a heat exchanger for exchanging heat between the cooling liquid and the storage container for the fuel gas. One problem with this arrangement arises from the fact that the canisters used for storing the fuel supply are arranged apart from the fuel cell stack. It follows that, as the heat exchanger has to be in direct contact with the canisters, it is necessary to provide ducts for delivering the cooling liquid from the stack to the heat exchanger. The presence of ducts for the cooling liquid contributes to increase the cost of making the fuel cell system. Furthermore, the system also comprises supply ducts to lead the preheated fuel gas to the stack. One will understand that, with such an arrangement, it is necessary to provide the supply ducts with thermal insulation in order to prevent the preheated fuel gas from cooling before it reaches the fuel cells. The presence of thermal insulation also contributes to increasing the cost of making the fuel cell system.

SUMMARY OF THE INVENTION

It is therefore an object of the present invention to solve the above-mentioned problems of prior art fuel cell systems by providing a fuel cell system according to the annexed claim 1.

BRIEF DESCRIPTION OF THE DRAWINGS

Other features and advantages of the present invention will appear upon reading the following description, given solely by way of non-limiting example, and made with reference to the annexed drawings, in which.

DETAILED DESCRIPTION OF THE INVENTION

Figure 1:
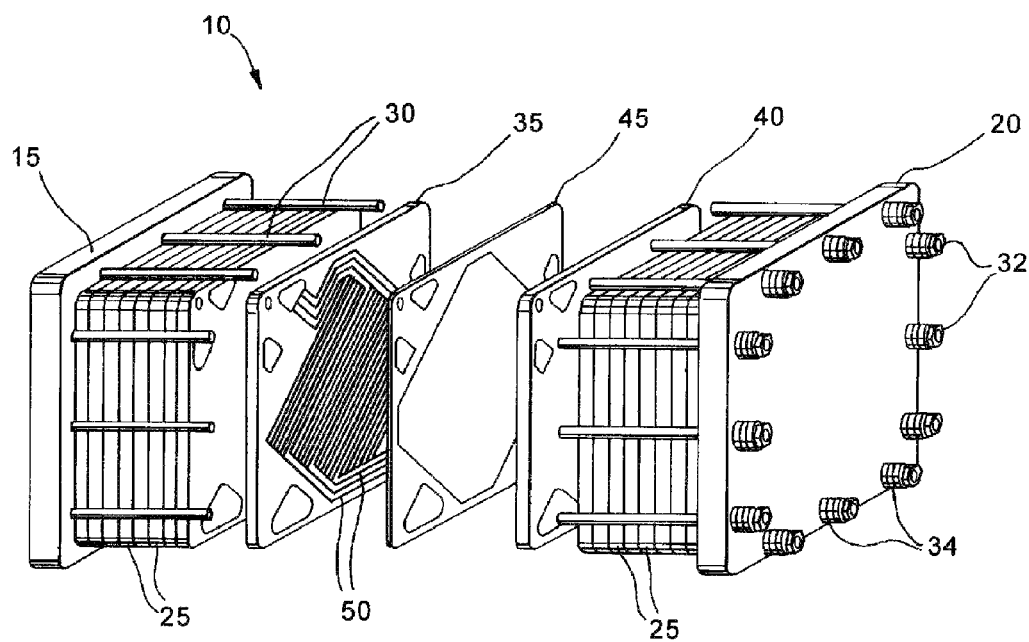
FIG. 1 is an exploded view of a conventional fuel cell stack (prior art)

FIG. 1 illustrates, in exploded view, a prior art proton exchange membrane fuel cell stack 10. Stack 10 includes a pair of end plate assemblies 15, 20 and a plurality of fuel cell assemblies 25. In this particular example, electrically insulating tie rods 30 extend between end plate assemblies 15, 20 to retain and secure stack assembly 10 in its assembled state with fastening nuts 32. Springs 34 threaded on tie rods 30 interposed between fastening nuts 32 and end plate 20 apply resilient compressive force to stack 10 in the longitudinal direction. Reactant and coolant fluid streams are supplied to, and exhausted from, internal manifolds and passages in stack 10 via inlet and outlet ports (not shown) in end plate 15.

Each fuel cell assembly 25 includes an anode flow field plate 35, a cathode flow field plate 40 and an MEA 45 interposed between plates 35 and 40. Anode and cathode flow field plates 35 and 40 are made out of an electrically conductive material and act as current collectors. As the anode flow field plate of one cell sits back to back with the cathode flow field plate of the neighboring cell, electric current can flow from one cell to the other and thus trough the entire stack 10. Cooling channels (not shown) are further provided between adjacent flow field plates. Other prior art fuel cell stacks are known in which individual cells are separated by a single bipolar flow field plate instead of by separate anode and cathode flow field plates. In this case, cooling channels may be provided within the bulk of the bipolar plate.

Flow field plates 35 and 40 further provide a fluid barrier between adjacent fuel cell assemblies so as to keep reactant fluid supplied to the anode of one cell from contaminating reactant fluid supplied to the cathode of another cell. At the interface between MEA 45 and plates 35 and 40, fluid flow fields 50 direct the reactant fluids to the electrodes. Fluid flow field 50 typically comprises a plurality of fluid flow channels formed in the major surfaces of plates 35 and 40 facing MEA 45. One purpose of fluid flow field 50 is to distribute the reactant fluid to the entire surface of the respective electrodes, namely the anode on the fuel side and the cathode on the oxidizer side.

Figure 2:
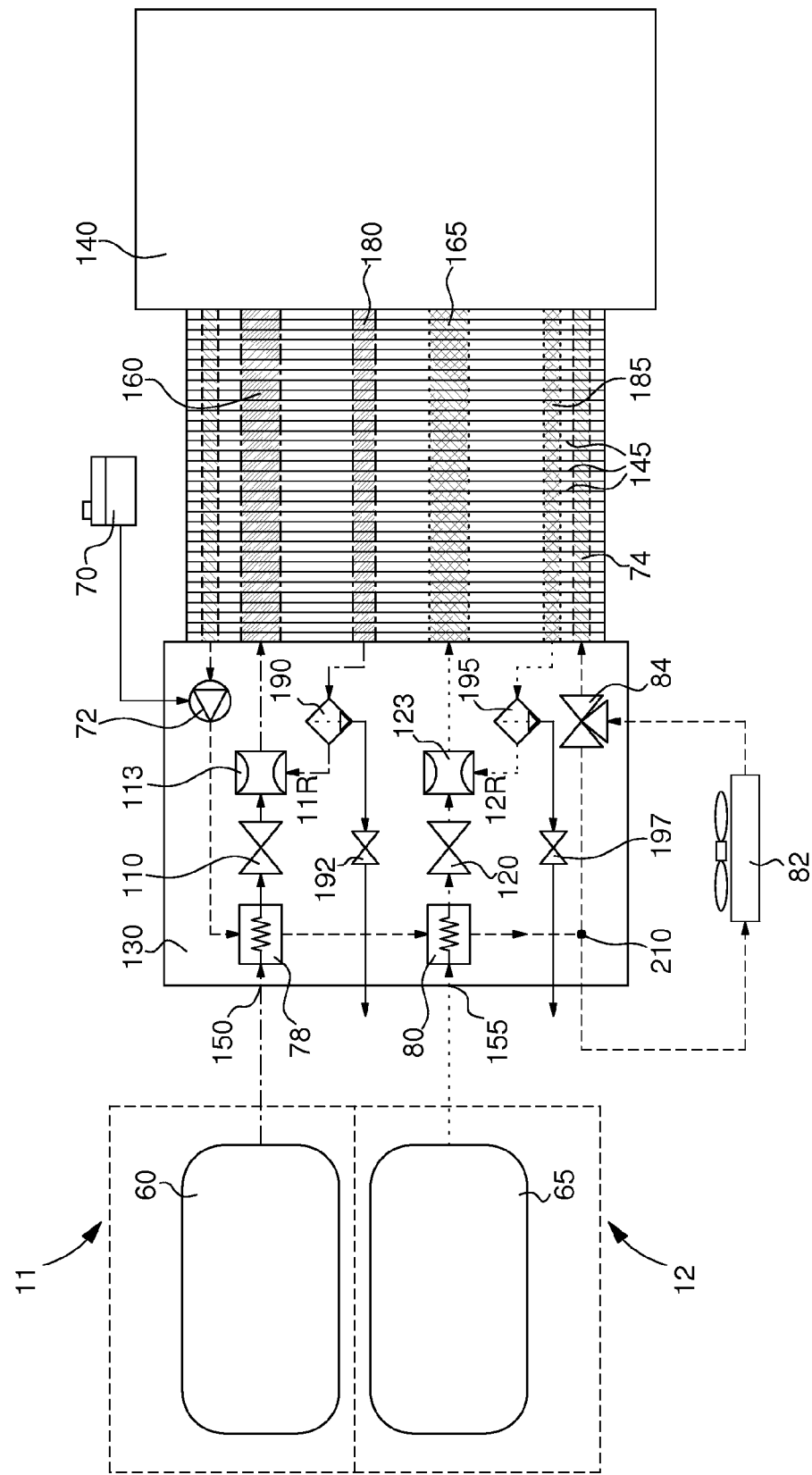
FIG. 2 is schematic representation of a particular embodiment of a fuel cell system according to the invention.

The fuel cell stack 1 illustrated in FIG. 2 includes end plates 130, 140, a fuel inlet port 150 and an oxidizer inlet port 155 in end plate 130. Stack 1 further includes a fuel supply manifold 160 and an oxidizer supply manifold 165 respectively for supplying a fuel stream and an oxidizer stream to a plurality of individual fuel cells 145.

FIG. 2 is only a schematic diagram. However, one should understand that the fuel supply manifold 160 can be connected to the upstream end of the anode flow field 50 (FIG. 1) of each fuel cell, while the downstream end of each anode flow field is connected to a fuel exhaust manifold 180. In a similar fashion, the oxidizer supply manifold 165 is connected to the upstream end of the cathode flow field of each fuel cell, while the downstream end of each cathode flow field is connected to an oxidizer exhaust manifold 185. According to the illustrated arrangement, the fuel and the oxidizer gasses enter each individual fuel cell through the flow fields. Then the depleted reactants and the reaction products from the stack are removed through the fuel exhaust manifold 180 and the oxidizer exhaust manifold 185.

The fuel cell system further comprises a fuel supply unit 11 and an oxidizer supply unit 12 arranged to provide a stream of hydrogen and a stream of oxygen respectively to the fuel cell stack. As illustrated, the fuel supply unit comprises a pressurized storage vessel 60 connected the fuel inlet 150 of the stack by means of a fuel supply line equipped with a fuel supply valve 110 and an ejector pump 113. A fuel recirculating line 11R connects the fuel exhaust manifold to the fuel supply line, downstream of supply valve 110. The ejector pump 113 provides for recirculating the used hydrogen and for mixing it with fresh hydrogen. The person with ordinary skill in the art will understand that the pump responsible for recirculating the used fuel does not have to be of the ejector type. Any appropriate type of gas pump can be used in place of ejector pump 113.

In a similar fashion, oxidizer supply unit 12 comprises a pressurized storage vessel 65 connected the oxidizer inlet 155 of the stack by means of a oxidizer supply line equipped with a oxidizer supply valve 120 and a vacuum ejector pump 123. An oxidizer recirculating line 12R connects the oxidizer exhaust manifold to the oxidizer supply line, downstream of supply valve 120. The ejector pump 123 (or any appropriate type of gas pump) provides for recirculating and for mixing the used oxygen with fresh oxygen.

The fuel cell system further comprises moisture management means. As product water is formed on the cathode side of the fuel cells by the combination of hydrogen and oxygen ions, the product water must be drawn away from the cathode side of the fuel cells. In the illustrated embodiment, in order to avoid flooding, the moisture management means comprise a gas-liquid separator 195 associated with a water exhaust valve 197 and arranged on the oxidizer recirculating line 12R. According to the present embodiment, a second gas-liquid separator 190 and a second water exhaust valve 192 are arranged on the fuel recirculating line 11R.

According to the invention, the fuel cell system further comprises a coolant circulation system using cooling liquid from a reservoir 70 for cooling fuel cell stack 1. In the illustrated embodiment, the coolant circulation system comprises a circulation pump 72, a cooling liquid inlet manifold 74, a cooling liquid outlet manifold 76, a first heat exchanger 78 for transferring heat to the stream of gas provided by the fuel supply unit 11, a second heat exchanger 80 for transferring heat to the stream of gas provided by the oxidizer supply unit 12, and a radiator 82 for extracting more heat from the cooling liquid in order to further lower its temperature. Furthermore, although not shown in the drawings, the illustrated fuel cell stack also comprises a plurality of coolant flow fields arranged in the stack in-between the individual fuel cells 145. The upstream end of each of these flow fields is connected to the cooling liquid inlet manifold 74, and the downstream ends are connected to the cooling liquid outlet manifold 76. Referring again to FIG. 2, the illustrated coolant circulation system further comprises a thermostatic bypass valve 84 arranged in such a way as to allow the cooling liquid to bypass radiator 82 whenever the temperature of the fuel cell stack is below optimal operating conditions.

According to the illustrated embodiment of the invention, the fuel and oxidizer supply valves 110 and 120, the ejector pumps 113 and 123, the gas liquid separators 190 and 195, the water exhaust valves 192 and 195 the circulation pump 72, the bypass valve 84, and the heat exchangers 78 and 80 are all integrated inside end plate 130. Such an arrangement offers considerable advantages, in particular concerning the compactness of the fuel cell system, its weight, and even concerning production costs.

Figure 3:
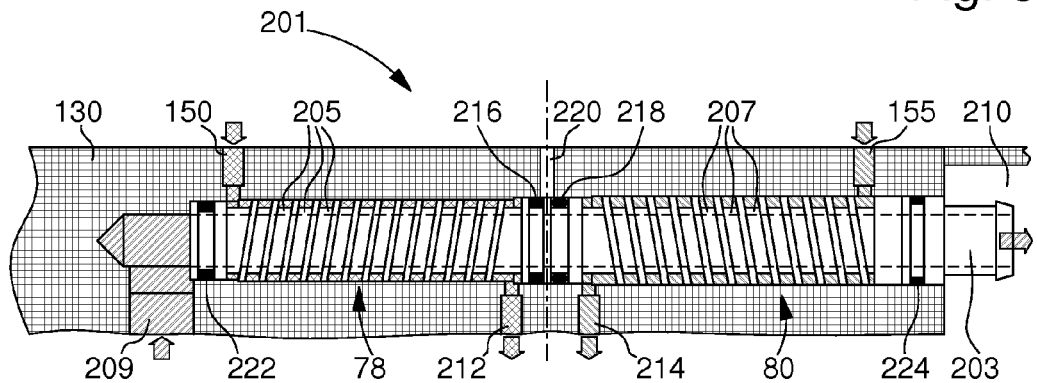
FIG. 3 is a cross-sectional view of an exemplary embodiment of the heat exchanger of the fuel cell system of FIG. 2.
Figure 4:
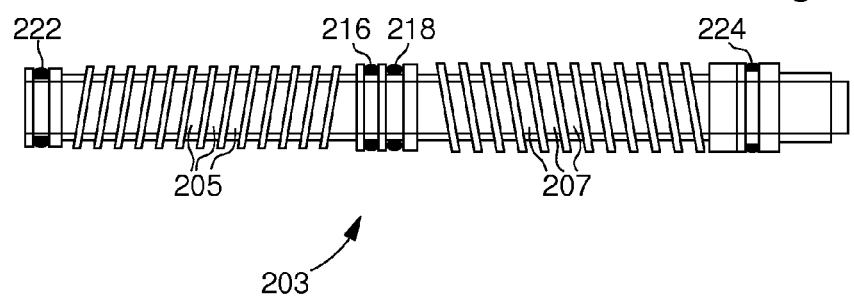
FIG. 4 is a cross-sectional view of the tube of the heat exchanger of FIG. 3.

The integrated heat exchangers 78 and 80 will now be described in detail while referring to FIGS. 3 and 4. As illustrated in FIG. 3, heat exchangers 78 and 80 are implemented in the form of one double heat exchanger generally referenced 201. The heat exchanger 201 basically consists of a tube 203 inserted into a cylindrical bore in the fuel cell end plate 130. The cooling liquid is made to enter the heat exchanger via an inlet 209 and to flow through the tube 203. The cooling liquid then leaves the heat exchanger through a cooling liquid outlet chamber 210. The fuel gas arriving via the inlet 150 and the oxidizer gas arriving via the inlet 155 flow around the tube 203 through helical channels referenced 205 and 207 respectively. Channels 205 and 207 are formed in an annular space existing between the tube 203 and the walls of the cylindrical bore. The fuel gas and the oxidizer gas are then made to exit heat exchanger 201 through outlets 212 and 214 respectively.

In the illustrated example, the separation of fluids and the sealing toward the ambient is done with o-rings. As the sealing between the fuel gas and the oxidizer gas is critical, the heat exchanger uses a pair of o-rings 216, 218 with a pressure relief to the ambient through a bore 220. An o-ring 222 arranged at one end of tube 203 seals the fuel gas from the cooling liquid, while an o-ring 224 arranged at the other end of the tube seals the oxidizer gas from the cooling liquid (or from the ambient in the case of a slightly different embodiment). Referring again to FIG. 3, one may observe that, in this particular embodiment, the fuel gas and the oxidizer gas enter heat exchanger 201 at opposite ends. The two gases then flow in opposite directions towards the outlets 212 and 214 that are positioned near the center of the heat exchanger. The person skilled in the art will understand that the present invention does not limit itself to these particular flow directions. However, in cases where the coolant stream undergoes a significant temperature change in the heat exchanger a counterflow arrangement (as illustrated) may be advantageous.

The tube 203 is made out of a material with good thermal conductivity, preferably aluminum. The helical channels 205, 207 can be machined in a standard aluminum tube having sufficient wall thickness. As shown in FIG. 4 in particular, the helical channels 205 and 207 are symmetric as they turn in opposite directions. However, the direction of rotation is arbitrary. According to yet another embodiment, there could be more than one fuel gas channel and more than one oxidizer gas channel. In this case, there would preferably be a first plurality of parallel fuel gas channels and a second plurality of parallel oxidizer gas channels. According to still another embodiment, the fuel gas channels and the oxidizer gas channels could have different sizes (i.e. different heights, different widths). The width of the walls between the channels could also be different.

Figure 5:
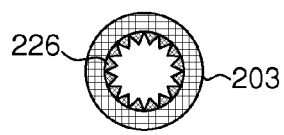
FIG. 5 is cross-sectional view of an alternative embodiment of the tube of the heat exchange of FIG. 3.

FIG. 5 is a cross-sectional view of the tube 203 according to yet another embodiment. According to the illustrated embodiment, the tube 203 comprises a star-shaped core 226 for optimizing heat transfer from the cooling liquid to the tube. This presence of the core 226 also increases the flow speed of the cooling liquid inside the tube 203. This arrangement contributes to the two ends of the heat exchanger 201 being at substantially the same temperature.

Figure 6:
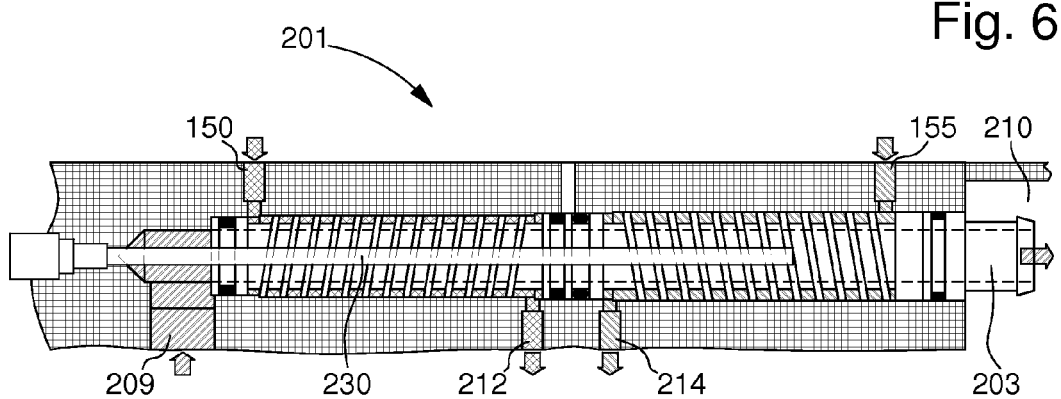
FIG. 6 is a cross-sectional view of an alternative embodiment of the heat exchanger of the fuel cell system of FIG. 2.

FIG. 6 is a cross-sectional view similar to that of FIG. 3 showing still another embodiment of the heat exchange 201 of the present invention. According to the illustrated embodiment, an electric heater 230 is integrated in the heat exchanger. The heater is of cylindrical shape and extends inside the tube 203 along its axis. The cooling liquid is made to flow in the annular space between the heater and the wall of the tube. The heater 230 is used for start up, or heat up of the fuel cell stack. According to still another embodiment, the star-shaped core 226 and the electric heater 230 can be combine in the same tube 203. In this case, the heater can be held in place by the ribs of the star-shaped core 226. In this way, part of the heat from the heating element 230 transfers directly to the tube, while another part of the heat transfers to the cooling liquid. The ratio of heat transfer can be optimized by adapting the quantity, height and width of the ribs of the star shaped core.

According to the embodiment illustrated in FIG. 2, a number of elements besides the heat exchangers 78, 80 are integrated in one of the end plates. However, the integration of these other elements will not be described in detail here, as a similar arrangement is already described prior art patent document WO 2007/045416.

It will be understood that various alterations and/or improvements evident to those skilled in the art could be made to the embodiment that forms the subject of this description without departing from the scope of the present invention defined by the annexed claims. In particular, instead of integrating the different components in a single end plates, the components could be distributed between the two end plates so that each component is integrated in one of the end plates. Furthermore, instead of having one double heat exchanger 201, the fuel gas heat exchanger 78 and the oxidizer gas heat exchanger 80 could be separate devices.

The invention claimed is:

1. A fuel cell system comprising:
a fuel cell stack comprising a plurality of fuel cells sandwiched between two end plates;
a fuel supply system to supply a stream of fuel gas to the fuel cell stack;
an oxidizer supply system to supply a stream of oxidizer gas to the fuel cell stack;
a closed loop coolant circulation system to drive a cooling liquid through the fuel cell stack so that the cooling liquid enters the fuel cell stack, absorbs heat from the fuel cells, and exits the fuel cell stack, the coolant circulation system comprising a circulation pump to drive the cooling liquid, a heat exchanger to remove heat from the cooling liquid and for at least partially transferring the heat to the stream of fuel gas and/or the stream of oxidizer gas;
wherein the heat exchanger comprises a tube made from a heat-conducting material and inserted into a bore in one of the end plates, the tube and the bore defining at least a first fluid channel inside the tube and a second fluid channel in a space existing between the tube and sides of the bore in the end plate, one of the first and second fluid channels being for the cooling liquid, and the other fluid channel being for the fuel or the oxidizer gas.

2. The fuel cell system according to claim 1, wherein the first fluid channel is for the cooling liquid and the second fluid channel is for the fuel gas or the oxidizer gas.

3. The fuel cell system according to claim 2, wherein the second fluid channel is arranged according to a pattern of a coil around the tube.

4. The fuel cell system according to claim 3, wherein the outer diameter of the tube is substantially equal to the diameter of the bore, and the second fluid channel is formed by a helical groove cut out of an outside wall of the tube.

5. The fuel cell system according to claim 2, wherein the heat exchanger comprises a third fluid channel arranged in the space existing between the tube and the sides of the bore in the end plate, the second fluid channel being for one of the fuel and oxidizer gases, and the third fluid channel being for the other of the fuel and oxidizer gases.

6. The fuel cell system according to claim 5, wherein the second channel is arranged in a first portion of the space between the tube and the sides of the bore, surrounding an upstream portion of the first fluid channel, and the third channel is arranged in a second portion of the space between the tube and the sides of the bore, surrounding a downstream portion of the first fluid channel.

7. The fuel cell system according to claim 6, wherein a third portion of the space between the tube and the sides of the bore is arranged in-between the first portion and the second portion, the third portion being hermetically separated from the first portion and from the second portion, and wherein the third portion is connected to a venting opening leading out of the stack.

8. The fuel cell system according to claim 1, wherein an inside of the tube is gilled or finned so as to increase heat transfer from the cooling liquid to the tube.

9. The fuel cell system according to claim 8, wherein a star-shaped core is arranged inside the tube.

10. The fuel cell system according to claim 1, wherein an electric heater is arranged inside the first channel.

11. The fuel cell system according to claim 1, wherein the coolant circulation system comprises a radiator to remove additional heat from the cooling liquid.

12. The fuel cell system according to claim 1, wherein the fuel gas is hydrogen.

13. The fuel cell system according to claim 12, wherein the oxidizer gas is oxygen.

14. The fuel cell system according to claim 3, wherein the heat exchanger comprises a third fluid channel arranged in the space existing between the tube and the sides of the bore in the end plate, the second fluid channel being for one of the fuel and oxidizer gases, and the third fluid channel being for the other of the fuel and oxidizer gases.

15. The fuel cell system according to claim 4, wherein the heat exchanger comprises a third fluid channel arranged in the space existing between the tube and the sides of the bore in the end plate, the second fluid channel being for one of the fuel and oxidizer gases, and the third fluid channel being for the other of the fuel and oxidizer gases.

\* \* \* \* \*